United States Patent
Thapa et al.

(10) Patent No.: US 12,530,447 B2
(45) Date of Patent: Jan. 20, 2026

(54) SECURE LEARNING SYSTEM

(71) Applicant: Commonwealth Scientific and Industrial Research Organisation, Acton (AU)

(72) Inventors: Chandra Thapa, Acton (AU); Seyit Camtepe, Acton (AU); Raj Gaire, Acton (AU); Surya Nepal, Acton (AU); Seung Jang, Acton (AU)

(73) Assignee: COMMONWEALTH SCIENTIFIC AND INDUSTRIAL RESEARCH ORGANISATION, Acton (AU)

(*) Notice: Subject to any disclaimer, the term of this patent is extended or adjusted under 35 U.S.C. 154(b) by 0 days.

(21) Appl. No.: 19/116,990

(22) PCT Filed: May 31, 2023

(86) PCT No.: PCT/AU2023/050465
§ 371 (c)(1),
(2) Date: Mar. 28, 2025

(87) PCT Pub. No.: WO2024/064994
PCT Pub. Date: Apr. 4, 2024

(65) Prior Publication Data
US 2025/0258906 A1    Aug. 14, 2025

(30) Foreign Application Priority Data
Sep. 30, 2022    (AU) .................. 2022241621

(51) Int. Cl.
*G06F 21/53*    (2013.01)
*G06F 9/455*    (2018.01)
*G06F 21/62*    (2013.01)

(52) U.S. Cl.
CPC .......... *G06F 21/53* (2013.01); *G06F 9/45558* (2013.01); *G06F 21/6245* (2013.01); *G06F 2009/45595* (2013.01)

(58) Field of Classification Search
CPC .. G06F 21/53; G06F 21/6245; G06F 9/45558; G06F 2009/45595; G06F 2009/45562
(Continued)

(56) References Cited

U.S. PATENT DOCUMENTS 11,052,311 B2*   7/2021   Bleasdale-Shepherd .................... A63F 13/73
11,080,336 B2*   8/2021   Van Dusen ............ G06Q 50/01
(Continued)

FOREIGN PATENT DOCUMENTS

CN          105630574 A        6/2016

OTHER PUBLICATIONS

NPL Search Terms (Year: 2025).*
(Continued)

*Primary Examiner* — Syed A Zaidi
(74) *Attorney, Agent, or Firm* — ARENTFOX SCHIFF LLP (57) ABSTRACT

A computer system comprising a first zone comprising first computing components configured to provide a consumer web application to define a machine learning model to be trained on a sensitive data set, and send the model via a first messaging queue; a second zone comprising second computing components that are isolated from the first zone, and configured to receive and send messages via the first messaging queue, receive the model, provide a vetter web application, and send the model via a second messaging queue; and a third zone comprising third computing components isolated from the first and second zone, and configured to receive and send messages via the second mes-
(Continued)

saging queue, receive the model, provide an execution manager application configured to control execution of operating system containers on client devices to train the model on sensitive data, the client devices being isolated from the first and second zone.

18 Claims, 3 Drawing Sheets

(58) Field of Classification Search
USPC .................................................. 726/22, 31
See application file for complete search history.

(56) References Cited

U.S. PATENT DOCUMENTS

| | | | | |
|---|---|---|---|---|
| 2014/0281544 | A1* | 9/2014 | Paczkowski | H04W 12/35 |
| | | | | 713/171 |
| 2018/0336479 | A1* | 11/2018 | Guttmann | G06V 10/764 |
| 2018/0336509 | A1* | 11/2018 | Guttmann | G06N 3/084 |
| 2019/0155633 | A1* | 5/2019 | Faulhaber, Jr. | G06N 5/04 |
| 2019/0182289 | A1* | 6/2019 | White | G06F 21/6245 |
| 2020/0145337 | A1 | 5/2020 | Keating et al. | |
| 2021/0073678 | A1* | 3/2021 | Chu | G06N 3/045 |
| 2022/0335340 | A1* | 10/2022 | Moustafa | G06N 20/00 |

OTHER PUBLICATIONS

Rolan et al., "The Data Airlock: infrastructure for restricted data informatics", Report TN22/01, 2022, 9 pages.

Curry et al., "Data Spaces: Design, Deployment, and Future Directions", Springer, 2022, 367 pages.

Kaissis et al., "End-to-end privacy preserving deep learning on multi-institutional medical imaging", Nature Machine Intelligence, vol. 3, Jun. 2021, pp. 473-484.

Perumal et al., "How to Build a Distributed Big Data Pipeline Using Kafka and Docker", medium.com, SFU Professional Computer Science, Feb. 13, 2021, 27 pages.

Silva et al., "Fed-BioMed: a general open-source frontend framework for federated learning in healthcare", Domain Adaptation and Representation Transfer, and Distributed and Collaborative Learning (DART DCL) Lecture Notes in Computer Science, vol. 12444, Springer, 2020, 11 pages.

Notification of Transmittal of The International Search Report and the Written Opinion of the International Searching Authority, or Declaration issued in International Application No. PCT/AU2023/050465, mailed Jul. 28, 2023, 5 pages.

Examination Report No. 1 for standard patent application, issued in Australian Application No. 2022241621, May 22, 2024, 4 pages.

Examination Report No. 2 for standard patent application, issued in Australian Application No. 2022241621, mailed Aug. 6, 2024, 5 pages.

Notice of Acceptance for patent application, issued in Australian Application No. 2022241621, mailed Aug. 26, 2024, 3 pages.

Written Opinion of the International Searching Authority, issued in International Application No. PCT/AU2023/050465, mailed Jul. 28, 2023, 5 pages.

* cited by examiner

SECURE LEARNING SYSTEM

CROSS-REFERENCE TO RELATED APPLICATIONS

The present application is a U.S. National Stage Application of International Patent Application No. PCT/AU2023/050465, filed May 31, 2023, which claims priority from Australian Patent Application 2022241621 filed on Sep. 30, 2022, the contents of each of which are incorporated herein by reference in their entireties.

TECHNICAL FIELD

This disclosure relates to a computer system for secure and private distributed learning.

BACKGROUND

Training machine learning algorithms on sensitive, illegal to possess, and psychologically harmful data is challenging because researchers have to do training without handling the data. Moreover, the nature of the data imposes a strict control, monitoring, and examination of all the activities involved, including communication, execution, and release of algorithms, datasets, outputs, and results. Moreover, the sensitive training data may be stored on multiple devices, rather than a central storage device, to ensure (i) all the sensitive data is not obtained if the single central device is exploited, and (ii) the devices can belong to independent different authorities.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A computer system comprising:
a first zone comprising one or more first computing components that are accessible from other computers external to the computer system and configured to:
  provide a consumer web application for a first user to define a machine learning model to be trained on a sensitive data set, and
  send the machine learning model via a first messaging queue;
a second zone comprising one or more second computing components that are isolated from the other computers and from the first zone, and configured to
  receive and send messages from the first computing components via the first messaging queue,
  receive the machine learning model from the first computing components via the first messaging queue,
  provide a vetter web application for a second user to inspect and approve the machine learning model, and
  send the machine learning model via a second messaging queue in response to the second user approving the machine learning model; and
a third zone comprising one or more third computing components isolated from the other computers, from the first zone and from the second zone, and configured to:
  receive and send messages from the second zone via the second messaging queue,
  receive the machine learning model from the second zone via the second messaging queue,
  provide an execution manager application, the execution manager application being configured to control execution of multiple independent operating system containers on respective multiple client devices to train the machine learning model on sensitive data hosted by the multiple client devices, the multiple client devices being isolated from the other computers, from the first computing components and from the second computing components.

It is an advantage to isolate the multiple client devices from the other computers, and the first and second computing components, to prevent the first and the second user from accessing the sensitive data used to train the machine learning model. It is a further advantage to execute multiple independent operating system containers on respective multiple client devices to prevent users, who have access to the third computing components, from accessing the sensitive data.

In some embodiments, the first messaging queue comprises a first part in the first zone and a second part in the second zone.

In some embodiments, the first part is implemented in a first container image and the second part is implemented in a second container image different from the first container image.

In some embodiments, the first part is executed by a first virtual machine in the first container image and the second part is executed by a second virtual machine in the second container image.

In some embodiments, the first part comprises a first bi-directional message queue server configured to process messages in the first zone and the second part comprises a second bi-directional message queue server configured to process messages in the second zone.

In some embodiments, the first part comprises a first writer module configured to send messages to the second zone and a first reader module configured to receive messages from the second zone.

In some embodiments, the first writer module is coupled to the first bi-directional message queue server via a first messaging connection to accept messages from the bi-directional message queue server and the second writer module is coupled to the first bi-directional message queue server via a second messaging connection, separate from the first messaging connection, to provide messages to the messaging server.

In some embodiments, the first writer module is one-directional to only send messages to the second zone and the first reader module is one-directional to only receive messages from the second zone.

In some embodiments, the first writer module and the first reader module are implemented as a micro-service.

In some embodiments, the first writer module and the first reader module are implemented as a different threads of a single process.

In some embodiments, the first writer module and the first reader module are configured to convert messages between a first protocol used to communicate with the messaging server and a second protocol used to communicate with the second zone.

In some embodiments, the first writer module in the first zone is configured to send messages to a corresponding second reader module in the second zone, and the first reader module in the first zone is configured to receive messages from a corresponding second writer module in the second zone.

In some embodiments, the second part comprises a second bi-directional message queue server, a second reader module and a second write module according to claims 5 to 12.

In some embodiments, the second messaging queue comprises a first part in the second zone and a second part in the third zone according to the above embodiments.

In some embodiments, the third computing components are configured to return results of the training via the second messaging queue to the second computing components, which are configured to provide the results of the training via the first messaging queue to the first computing components.

In some embodiments, the second computing components are further configured to:
provide the vetter web application for the second user to inspect and approve the results of training in response to returning the results of the training to the second computing components; and
send the results of the training via the first messaging queue to the first computing components in response to the second user approving the results via the vetter web application.

In some embodiments, each of the multiple independent operating system containers are configured to mount a data storage device storing the sensitive data from one of the multiple client devices.

In some embodiments, each of the multiple independent operating system containers are further configured to:
terminate the training of the machine learning model after a predetermined time;
provide the results of the training to the third computing components in response to terminating the training; and
terminate the respective operating system container in response to terminating the training, thereby removing the sensitive data from the respective operating system container.

A method for training a machine learning model on a sensitive data set in a first zone, the method comprising:
receiving and sending messages from a second zone via a messaging queue;
receiving the machine learning model from the second zone via the messaging queue;
controlling execution of multiple independent operating system containers on respective multiple client devices to train the machine learning model on sensitive data hosted by the multiple client devices.

In some embodiments, the first zone is isolated from the second zone.

Software that, when installed on a computer and executed by the computer, causes the computer to perform the method of any one of the preceding claims.

Optional features provided in relation to the method, equally apply as optional features to the software and the system.

BRIEF DESCRIPTION OF DRAWINGS

An example will be described with reference to the following drawings.

DESCRIPTION OF EMBODIMENTS

Releasing sensitive raw data, such as child exploitation materials for example, to data consumers (e.g., machine learning model developers and researchers) is not practical due to ethical and legal concerns. Moreover, data obfuscation techniques (such as data masking, where the sensitive data is obscured to make it useless to exploiters) are either insufficient or decrease the utility of data. As a solution, data consumers could share their analytical algorithms with data custodians (e.g., police) to develop or train their models and analyse the results. However, the following difficulties exist with this approach: (i) data custodians may not have the capabilities to host and administer the computing framework, and (ii) model developers can have the necessary capabilities and resources to perform such computations, but they may need to establish a verifiable secure environment, processes and protocols to host sensitive data.

This disclosure provides a computer system comprising soft air gaps between multiple zones to isolate and control communication in and out of the framework. An air gap, also referred to as an air wall, air gapping or disconnected network, is a network security measure employed on one or more computers to ensure that a secure computer network is physically isolated from unsecured networks, such as the public Internet or an unsecured local area network. However, this disclosure utilises soft air gaps, which enables a connection between the multiple zones that is strictly controlled and monitored through the message queue system.

As such, only one zone may be connected to the Internet and may be accessible by a researcher, who needs to train their model on sensitive data. In other words, a researcher is the only one entity in the disclosed system that is connected to the internet. The researcher may interact with the other zones that are isolated from the researcher through the soft air gaps between the zones and not the internet. However, a zone may communicate with another zone via a messaging queue, for which the zone may send messages to the other zone as well as receive messages from that zone. The messaging queue may leverage one or more messaging brokers to exchange message between two zones. Each zone may comprise one of more computing components, which may be various computers, data storage devices, servers, user interface, for example.

The disclosed system may be considered as a soft air-gapped and soft air-locked machine learning system, as the multiple zones are isolated from each other (i.e., air gapped), where the last zone executes instances of air-locked container images that are inaccessible by a user of the respective system (e.g., server system administrator). The multiple zones may also include (i) a vetter to investigate and approve incoming model/algorithm, and outgoing information, (ii) encrypted data vaults, and (iii) airlock instances for the secure execution/computation. The disclosed system, with an extension, runs distributed machine learning algorithms such as federated and split learning using multiple data custodians.

This disclosure also provides a method for training a machine learning model on a sensitive data set in a zone, wherein the zone is isolated from other zones, by means of a soft air gap between the two zones. This method utilises distributed learning to train the machine learning model, as the sensitive data may be stored on multiple storage devices. As an example, there may be multiple devices, such as client devices, in the zone where the training occurs, where each device stores the sensitive data or a subset of the sensitive data. One of the computing components in this training zone may be a central server or execution manager that sends the machine learning model or a portion of the machine learning model to multiple devices in this training zone.

The disclosed system and method present a generic framework and are thus useful for various scenarios. As one example, a researcher may be interested in developing a machine learning model, such as a classifier, which classifies images as containing child exploitation. Machine learning models are trained through a process of supervised learning, wherein the model is given an image from a data set, and the model is updated based on the prediction it gives from that image. As such, a classifier of child exploitation would need images containing child exploitation to be trained, so it can accurately classify images. However, child exploitation images are illegal to possess and, as such, are under the control of data custodians, such as the police. The disclosed system and method enables researchers to train and develop their machine learning models, without having direct access to sensitive or restricted data. In another example, the disclosed system and method may be applicable in healthcare, where queries are made over genetic data to uncover the chance of a particular disease, for example. The genetic data is confidential information as it relates to patient data and thus, the disclosed system and method enable researchers to train and evaluate their machine learning model without having direct access to this confidential information.

Overall System

Figure 1:
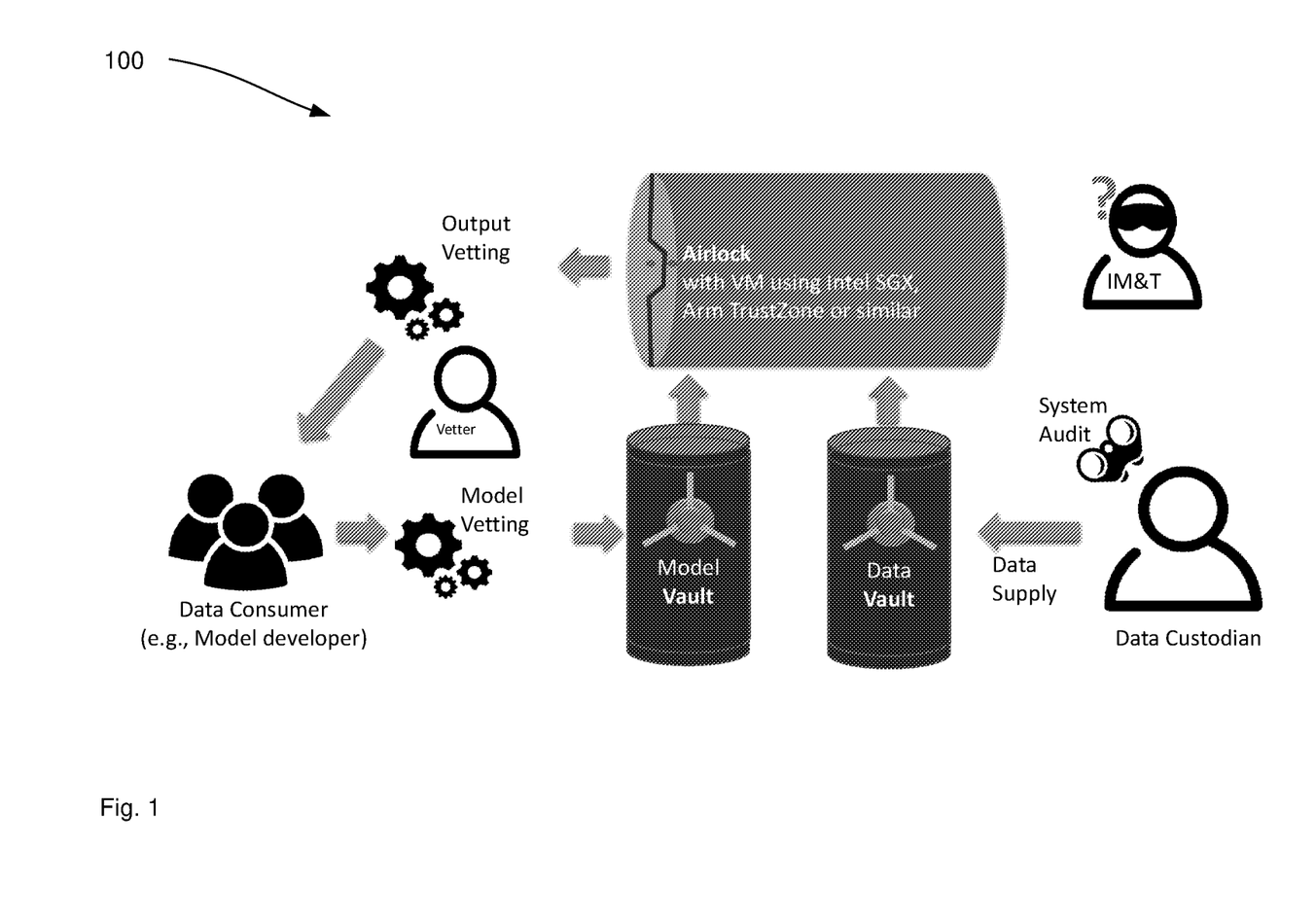
FIG. 1 illustrates an overview of the secure learning system.

FIG. 1 illustrates an overview of the secure learning system 100. The overall system may have multiple user roles for different purposes in different zones. For example, the system may have five user roles: data custodians, data consumers, hosts, vetter, and auditor, who may be various users of the overall system and may have different authorisations depending on their role. It is noted that there may be multiple users who assume the same role in the overall system. Data custodians are trusted entities responsible for structuring, encrypting, and submitting data to the data vault. For example, data custodians may be a law enforcement officer who regulates the sensitive data kept on a private server or private data storage devices. They may also need to annotate and release metadata about their datasets to assist consumers. Moreover, data custodians may update, extend, restrict access to or remove existing datasets without notifying consumers.

Data consumers are untrusted entities that are developing machine learning algorithms (e.g., classifiers) or querying on datasets. A data consumer may (i) request information about a dataset or outputs of other models, (ii) submit models for training, and (iii) receive the vetted analysis results (e.g., accuracy and CPU cycles). The host is responsible for the hardware and software components. The host is managed by Information Management and Technology (IM&T) staff, those having complete control of the hardware platforms (e.g., network, computers, and storage units), operating systems, and applications to perform their daily tasks. The IM&T staff is assumed to be honest and interested in maintaining the integrity and availability of the system. However, they might be curious to see certain parts of the datasets or might do so unintentionally, e.g., a memory dump containing illegal content (e.g., child abuse images). In overall system, security governance responsibilities may be shared between the IM&T team of the host and the data custodians: the former controls hardware and software layers while the latter controls application and data layers.

Data and model vetters are trusted entities (e.g., authorized person) who are responsible for checking and approving the submitted models or queries, the outputs of the models or queries executed on the datasets. The vetting process may be (semi) automated where the data vetters only manage the vetting rules. Auditors are trusted entities that are responsible for auditing the security of the framework. They do so by looking at the logs related to framework components and stakeholders' activities. The outcome of these audits may result in the suspension of the existing model executions, restrictions on dataset access, removal of output data and models from the system repository, and restrictions on misbehaving stakeholders.

System Architecture and Implementation

Figure 2:
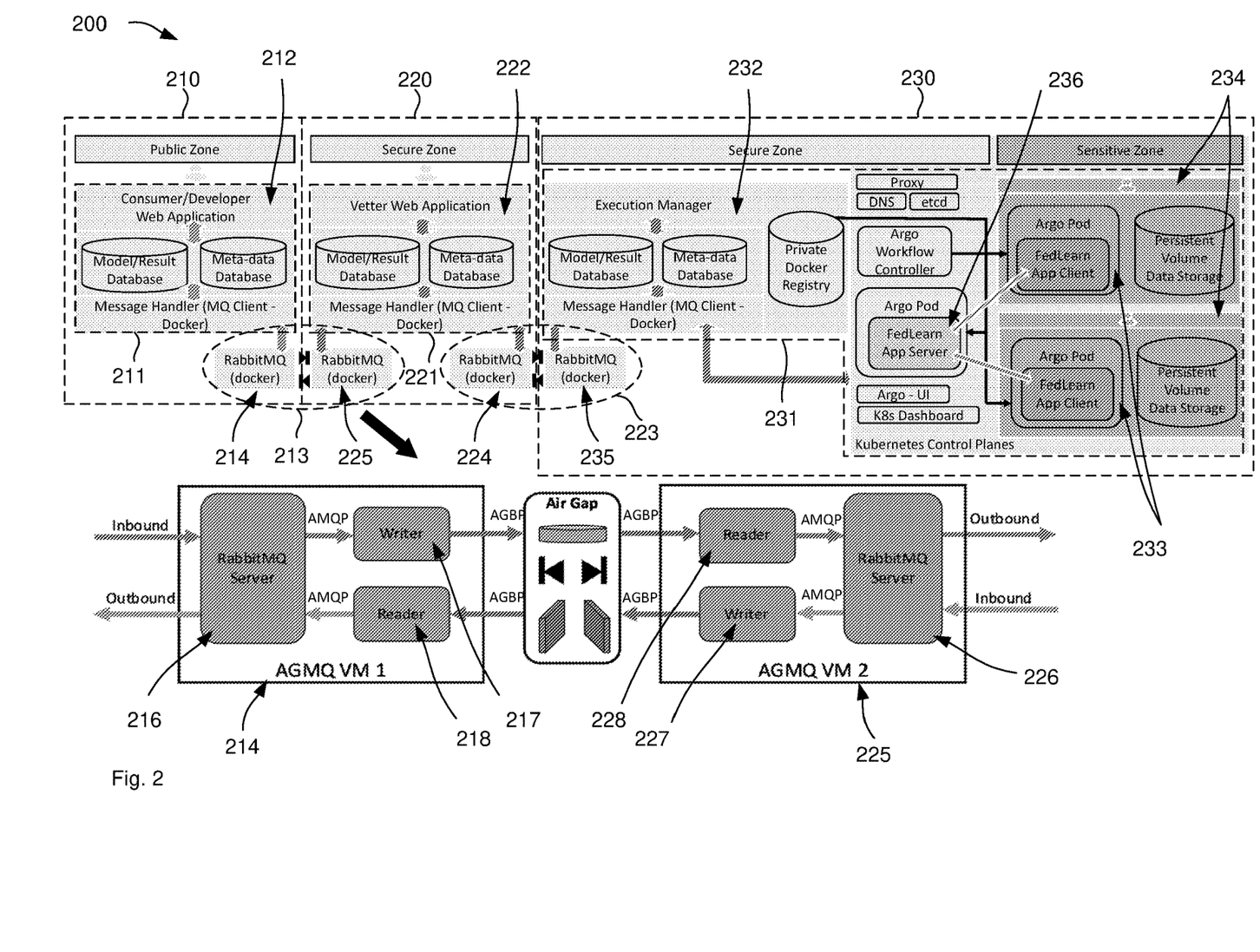
FIG. 2 illustrates a computer system for secure distributed learning.

FIG. 2 illustrates a computer system 200 for secure distributed learning. Computer system 200 has multiple zones with different, e.g., tiered security settings. For example, there are three zones: public zone, secure zone, and sensitive zone. Only the public zone is connected to the internet. A data consumer and its system environment fall in the public zone; data and model vetters and their system environment fall in the secure zone; data custodians, host, and auditors fall in the sensitive zone. The system environments of each zone may comprise one or more computing components, which may include various computers, devices, servers, storage devices, user interfaces, for example.

The sensitive data never leaves the sensitive zone and is always in the control of the data custodian, which is isolated from the secure and the public, to ensure these zones (and therefore, the data consumers and the vetters) do not have access to the sensitive data. The public and secure zones with the vetter application may be hosted on public servers (usually central processing unit (CPU) servers), whereas the sensitive zone and the secure zone with execution manager may be hosted on the private server; such as graphics processing unit (GPU) server. For example, the private server may be a NVIDIA DGX System. The private server is used for hosting the airlocks and their computations, and storage server (usually CPU servers) to store (encrypted) dataset which all may be part of the sensitive zone.

All three zones may have web user interfaces (UI) for their operations, e.g., the public zone web UI allows data consumers to upload models, update models, download synthetic datasets or metadata, and monitor execution status. The one or more computing components of each zone may be a user interface module that contains program code that, when executed by a processor, causes one or more computing components to generate the web UI for a user to interact with and generate user input data. The one or more computing components may also be configured to or connected to a monitor or display, in which a user may interact with. The user interface is configured to accept input (via buttons or text fields etc.) from the user, via a touch screen or a device in communication with the one or more computing components, such as a keyboard or computer mouse. These devices may also include a touchpad, an externally connected touchscreen, a joystick, a button, and a dial. Web UIs may be built on Sails, which is a Model-View-Controller framework for Node.js (https://nodejs.org/), where their sign-on solution is provided by Auth0 (based on OpenID Connect authentication protocol) with authorized policies, which manages the different roles provided in the system.

Computer system 200 comprises a first zone 210 comprising one or more first computing components 211 that are accessible from other computers external to the computer system, such as computers on the internet or another public data network. The computing components 211 are configured (i.e. programmed) to provide a consumer web application 212 for a first user to define a machine learning model to be trained on a sensitive data set, and send the machine learning model via a first messaging queue 213. First zone 210 may also be referred to as the "public zone" or the "consumer zone", as it may be connected to the Internet to enable a first user to access consumer web application 212. In some examples, first zone 210 is hosted on a public server, which may be a CPU server.

The first user may be a researcher or model developers, who develops a machine learning model and needs to train the model on sensitive data. As such, the first user may also be referred to as a "data consumer". The sensitive data set may contain data, such as images and videos, that contains confidential, exploitative, or psychologically harmful content and the sensitive data may be illegal to possess. Therefore, the disclosed system enables a first user to train and evaluate their model on this sensitive data, without the first user having direct access to the sensitive data.

First computing components 211 may generate a user interface that enables the first user to upload models, update models, download synthetic datasets or metadata, and monitor execution status via consumer web application 212. The first user may specify factors relating to the training of their machine learning models, such as the runtime execution, number of epochs, distributed learning technique, model analysis technique, for example. The first user may also have to login to consumer web application 212 using their user credentials. One or more first computing components 211 may authenticate and identify the first user using REST APIs and use an authentication methods, such as, but not limited to, Basic Auth, JWT/Bearer token or API key.

The machine learning model may be a classifier, such as a multiple layered perception, convolutional neural network, residual neural network or other classifier. In an example, the machine learning model may be applied to an image and the machine learning model may provide an output value, which may be the probability that the image is a child exploitation image. In an example, the machine learning model has exactly two possible output classifications. In this sense, the machine learning model may be a binary classifier. However, the machine learning model may also be any variation of neural network including convolutional or deep with any number of layers, and may also be a decision tree or support vector machine (SVM). These are only a few examples of possible models that the machine learning model may be, however the machine learning model is not limited to the models mentioned here. The machine learning model may also comprise a combination of machine learning models, in which the output of one machine learning model may be input for a subsequent machine learning model.

One or more first computing components 211 may be data storage devices or systems. For example, one or more first computing components 211 may be a model/result database and/or a metadata database. The model/result database may be a non-transitory computer-readable medium which stores the machine learning model as specified by the first user and may also store the results of training the machine learning model after training the model in another zone. As an example, if the machine learning model is a neural network, the model/result database may store the parameters of the neural network. Metadata database may also be a non-transitory computer-readable medium which stores metadata relevant to the first user. This metadata may include the time when the vetting process commenced or terminated, training commenced or terminated or the size of the dataset and its features used to train the machine learning model, for example.

Computer system 200 further comprises a second zone 220 comprising one or more second computing components 221 that are isolated from the other computers and from the first zone 210. The second computing components 221 are configured to receive and send messages from the first computing components 211 via the first messaging queue 213, receive the machine learning model from the first computing components 211 via the first messaging queue 213, provide a vetter web application 222 for a second user to inspect and approve the machine learning model and send the machine learning model via a second messaging queue 223 in response to the second user approving the machine learning model. Similar to the one or more first computing components 211, one or more second computing components 221 may be a model/result database and/or a metadata database. Second zone 220 may be part of the "secure zone", in which the second zone 220 is not directly connected to the Internet. Second zone 220 may be referred to as the "vetter zone", as it is the zone in computer system 200 where the machine learning model is vetted (inspected).

Vetter web application 222 enables the second user to inspect the machine learning model for any maliciousness that the first user may have included in their machine learning model. As such, the second user may be referred to as a data and model vetter, or simply a vetter. However, the second user may be multiple user, for example, one user may be a data vetter and another user may be the model vetter. In some examples, the one or more second computing components 221 may be a vetter web application module, that contains program code which, when executed by a processor, causes one or more second computing components 221 to generate vetter web application 222 to the second user. Similar to the consumer web application 212, the second user may have to login to vetter web application 222 using their user credentials to authenticate and identify the second user. In some examples, the second user must be authorised by a data custodian or another trusted entities before the second user uses vetter web application 222.

In a preferred embodiment, second zone 220 is isolated from first zone 210 by means of a soft air gap, such that the first user cannot access second zone 220, either physically or by some means of communication. However, as first zone 210 and second zone 220 are isolated by means of a soft air gap, a first user may push their request from first zone 210 to second zone 220 through the messaging queue and receive a message from second zone 220 by the same means. In some examples, one or more second computing components 221 may be located in a facility that is unknown to the first user. In some examples, one or more second computing components 221 may be located in a facility that is unknown to the second user, however the second user may have access to a virtual private network (VPN) that the second user may use to access one or more second computing components 221, such as vetter web application 222. In those examples, the second computing components 221 are not exposed to the Internet and their IP addresses may be local to the second zone and not translated or reachable globally.

The vetting process ensures the machine learning model specified by the first user will not exploit the sensitive data in some way and also checks if the model is hiding any malicious codes. In some examples, the machine learning model may store metadata about the sensitive data, which may be confidential information. Further, the vetting process enables the second user to determine whether the machine learning model is compatible with the distributed learning provided by computer system 200. Further, the vetting process enables the second user to determine whether the machine learning model contains any errors or "bugs". Upon performing the vetting process, the second user may compile a report regarding the vetting process and, by the vetter web application 222 provided by first computing components 211, may send the report to the first user via the first messaging queue 213. The first user may read and/or download the report via consumer web application 212 provided by first computing components 211.

In some examples, if the second user finds no issues with the machine learning model, the second user approves the model and sends the machine learning model to the following zone via the second messaging queue 223. However, the second user may find issues with the machine learning model, in which case, the second user may not send the model to the following zone, but rather, the second user may send the report to the first user via the first messaging queue 213, wherein the report contains an alert of the issues. The report may also contain specific information indicative of the issues, and the second user may provide remedies that the first user may implement, so that the machine learning model can be approved. The second user may also send the report or another report to the following zone via another messaging queue to inform a data custodian of any issues found in the machine learning model or to inform the data custodian of any information required by the data custodian in order to allow the model to be trained.

Finally, computer system 200 comprises a third zone 230 comprising one or more third computing components 231 isolated from the other computers, from the first zone and from the second zone, and configured to: receive and send messages from the second zone via the second messaging queue 223, receive the machine learning model from the second zone via the second messaging queue 223, provide an execution manager application 232. The execution manager application 232 is configured (i.e. programmed) to control execution of multiple independent operating system containers 233 on respective multiple client devices 234 to train the machine learning model on sensitive data hosted by the multiple client devices 234, the multiple client devices 234 being isolated from the other computers, from the first computing components 211 and from the second computing components 221.

A system container (or simply, a container) is a standard unit of software that packages up code and all its dependencies so the application runs quickly and reliably from one computing environment to another. Containers contain all software, such as program code, libraries and data, necessary to perform a specific task, as specified by a user. Containers are similar to virtual machines, as they have similar resource isolation and allocation benefits, but function differently because containers virtualize the operating system instead of hardware. Containers are an abstraction at the app layer that packages code and dependencies together. Multiple containers can run on the same machine and share the OS kernel with other containers, each running as isolated processes in user space. In computer system 200, one or more of the multiple independent operating system containers 233 may run on the same client device, for example. However, in this example, multiple independent operating system containers 233 operate independently from each other, in the sense that, each operating system container does not communicate or share information/data. Further, for distributed learning, only one system container may be necessary on a client device, hence each of the multiple client device may only execute one container instance at once instance. In one example, the containers are Docker containers or images. In another example, a data consumer may provide a separate request to run one or more Docker container instances on one of the multiple client devices. As such, anyone of the multiple client devices may be configured to run multiple independent operating system containers 233 (e.g., Docker container instances).

Third zone 230 may be part of a "secure zone", in which the second zone 220 is not directly connected to the Internet. Third zone 230 may also comprise a "sensitive zone", where the sensitive dataset never leaves the sensitive zone and is always in the control of the data custodian (i.e., a trusted entity who is responsible for handling the sensitive data). In some examples, multiple client devices 234 are part of the sensitive zone and each client device may store a copy of the sensitive dataset or a subset of the collective sensitive dataset. In an example, the sensitive zone may comprise multiple private servers where each private server is operated by a different police department. Hence, each server may comprise a different set of sensitive data, for which the machine learning model can be trained on.

In some examples, one or more third computing components 231 may comprise an execution manager, such as a computer or server, that generates execution manager application 232 and controls execution of multiple independent operating system containers on respective multiple client devices 234 to train the machine learning model on sensitive data hosted by the multiple client devices 234. The execution manager may receive the machine learning model that has been approved by the vetting process performed in second zone 220, and may send a copy of the machine learning model or a copy of a portion of the machine learning model to the multiple client devices 234. After training the machine learning model of the portion of the machine learning model on each of the multiple client devices 234, the execution manager may receive results of the training from each of the multiple client device 234 and may process the results of the training. Processing the result of the training may comprise creating a single trained machine learning model by processing the weights of the model received from the multiple client devices 234 or creating a training report which comprises information relevant about the training of the model that a first user may be interested in. Training the machine learning model refers to updating parameters of the model to reduce an error between labels and model outputs, such as via backpropagation and gradient descent methods.

After training the machine learning model, the execution manager may be configured to test the performance of the trained machine learning model. The execution manager may send a copy of the trained machine learning model to the multiple client devices 234, wherein each of the multiple client devices 234 test the performance of the model using the sensitive data that is accessible by each client device. The execution manager may then receive the results of the performance test and process the results. For example, the execution manager may average the result of the performance test to obtain a single metric for performance of the trained machine learning model. The execution manager may include this performance metric, the processed performance results or the results from each of the multiple client devices.

In some examples, multiple client devices 234 train the machine learning model on sensitive data by a distributed learning technique, such as federated learning. In federated learning, multiple devices each have a copy of the machine learning model and train the model using a different set of data that is locally available to the respective device. In this sense, the data is not shared between the multiple devices. This is an advantage as the machine learning model can be trained on multiple sets of sensitive data on different, and isolated, computing components, such as computers or server devices. After training the model on each device, the each trained model from each device is sent back to a central manager, such as a server which may comprise an execution manager, where the models are averaged to obtain a single model. More specifically, the central manager averages the respective weights of each trained model to determine the overall weights of the single model. The single model can then be sent to each device and the training process may be repeated.

In some examples, multiple client devices 234 may train the machine learning model on sensitive data using split learning. In split learning, the machine learning model is split into two portions, with one portion being sent to multiple client device and the other portion remaining on a central server. Each of the multiple client device contain local data and trains the portion locally. The client devices and the central server communicate by sending activations, called smashed data, of the split layer, called cut layer, from the client devices to the server, and receiving the gradients of the smashed data from the server. The synchronization of the learning process with multiple client devices 234 may be done either in a centralized mode or peer-to-peer mode. In some examples, a sequential synchronization process may occur where one of the multiple client devices 234 sends the results of training the model to another client device, where this client device continues training the model. Split learning enables the data to remain on the client devices, where is not shared with the other client devices or the server, while also reducing the computational requirements of the client devices.

While federated learning and split learning is used as an example here, computer system 200 is not limited to federated learning. For example, computer system 200 may perform any distributed learning technique. In some examples, an execution manager may execute execution manager application 232, which may partition the sensitive data set and, in some examples, distribute the partitions the multiple client device 234 for training of the machine learning model. Training of the machine learning model may then be performed on the partitioned sensitive data. In some examples, the execution manager horizontally partitions the data, which involves putting different rows into different tables, such that multiple subsets of the sensitive dataset are obtained. In some examples, the execution manager vertically partitions the data, which involves creating tables with fewer columns and using additional tables to store the remaining columns. A certain partitioning method may be optimal for the particular distributed learning technique being used by the one or more third computing components 231 to train the machine learning model.

In some examples, the execution manager may not partition the data, but may receive data from a database that is already partitioned. In some examples, the execution manager is involved in the process of training the machine learning model. For example, the execution manager may store sensitive data, a subset of sensitive data (such as a partition) may configured to train the machine learning model or a portion of the machine learning model using the sensitive data.

Once the model training is complete, the model can be used to classify unclassified data, such as unclassified images retrieved from the internet, to detect illegal activities, for example.

It is noted that any one of computing components may be or comprise one or more processors connected to a program memory and a data memory. The program memory and data memory are non-transitory computer-readable mediums, such as a hard drive, a solid state disk or CD-ROM. Software, that is, an executable program stored on program memory causes the processor to perform the functioning of the computing components. The data memory may store the machine learning model, vetting report or training report, for example. For example, if the machine learning model is a trained neural network, the data memory may store the machine learning model in the form of network parameters (i.e., the weights) that have been optimised through training the machine learning model.

The processor may receive data through all these interfaces, which includes memory access of volatile memory, such as cache or RAM, or non-volatile memory, such as an optical disk drive, hard disk drive, storage server or cloud storage. The computer system 200 may further be implemented within a cloud computing environment, such as a managed group of interconnected servers hosting a dynamic number of virtual machines.

It is to be understood that any receiving step may be preceded by the processor determining or computing the data that is later received. For example, processor may store the machine learning model on data memory, such as on RAM or a processor register. Processor then requests the data from the data memory, such as by providing a read signal together with a memory address. The data memory provides the data as a voltage signal on a physical bit line.

In some examples, any one of the computing components may communicate within their respective zone by using a Wi-Fi network according to IEEE 802.11. The Wi-Fi network may be a decentralised ad-hoc network, such that no dedicated management infrastructure, such as a router, is required or a centralised network with a router or access point managing the network.

Any one of the computing components in their respective zones may be an I/O port. It is to be understood that any kind of data port may be used to receive data, such as a network connection, a memory interface, a pin of the chip package of one or more of the computing components, or logical ports, such as IP sockets or parameters of functions stored and executed by one or more of the computing components. The parameters of functions may be stored on one or more of the computing components and may be handled by-value or by-reference, that is, as a pointer, in the source code.

Any one of the computing components in any zone may be a program code module that contains program code, such as computer readable and computer executable code. The program code, when executed by a processor, which may be one of the computer components, may cause any number of computing components to perform the method of any of the embodiments described herein. The method of any one of these embodiments is to be understood as a blueprint for the software program and may be implemented step-by-step, such that each step is represented by a function in a programming language, such as Python, C++ or Java. The resulting source code is then compiled and stored as computer-executable instructions on any one of the computing components in the respective zone.

Software Stack

Figure 3:
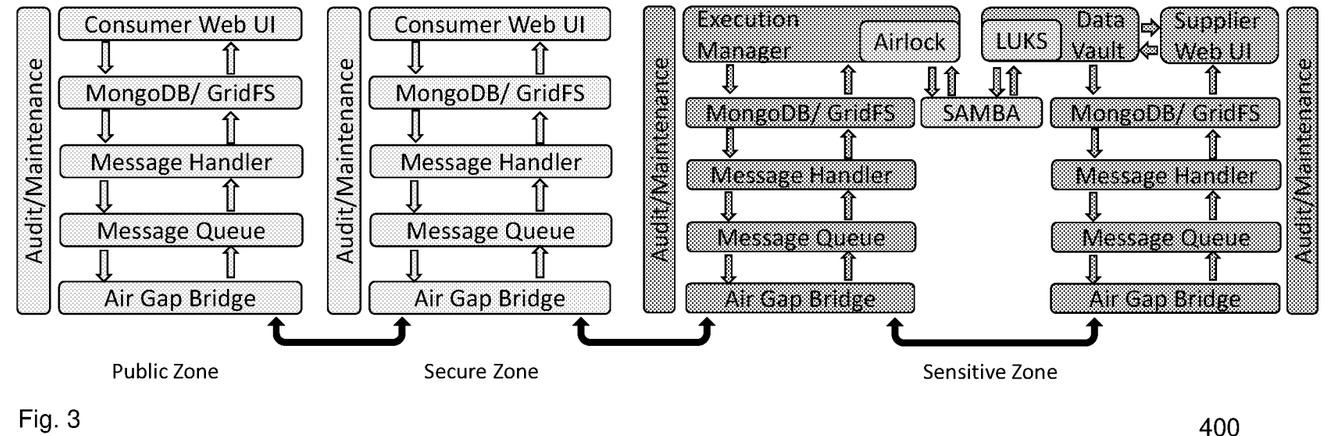
FIG. 3 illustrates the software stack of the computer system.

FIG. 3 illustrates the software stack of the computer system. The software components of the disclosed system may be divided into two major classes; (i) components designed as Docker images and (ii) components designed as native applications. Docker is a container management server, where a container can be developed, shipped and run anywhere. More specifically, Docker is a set of platform as a service (PaaS) products that use OS-level virtualization to deliver software in containers. The web portal, database, message queue, air gap bridge, software vetting, maintenance, and audit are designed as Docker container images. Execution manager and data vault may be designed as native applications that do not run as a container. Moreover, they need to access the base operating system to perform their functionalities. One or more of the computing component may be a database and may implemented using MongoDB/GridFS, which is an open-source, NoSQL, document-oriented database program.

In some examples, first messaging queue 213 may comprise a first part 214 in the first zone 210 and a second part 225 in the second zone 220. First messaging queue 213 enables communication between first zone 210 and second zone 220, despite both zones being isolated from each other by means of an air gap. In some examples, first part 214 may be implemented in a first container image and the second part 225 may be implemented in a second container image different from the first container image. For example, these parts may be Docker container images. In some examples, the first part 214 may be executed by a first virtual machine in the first container image and the second part 225 may be executed by a second virtual machine in the second container image.

Air Gap Solution

For the strict control of the access and message transfer between the zones, a soft air gap solution is implemented in computer system 200. The air gap is achieved by using a message queue (MQ), which permits one-way communication for each session between the MQs. As such, there will be no Transmission Control Protocol (TCP) or Universal Computer Protocol (UDP) replies. In some examples, the first part 214 of the first messaging queue 213 may comprise a first bi-directional message queue server 216 configured to process messages in the first zone 210 and the second part may comprise a second bi-directional message queue server 226 configured to process messages in the second zone 220. In some examples, the first and second bi-directional message queue server may be implemented using RabbitMQ (https://www.rabbitmq.com/) which is an open-source message broker software and, such as, one can consider these servers as RabbitMQ servers.

The air gap components may consist of MQ handler and MQ. MQ handler may receive message from MongoDB (i.e., special collection names such as model, execution, and server image). Available messages may be read from MongoDB and published through RabbitMQ. RabbitMQ may use Advanced Message Queuing Protocol (AMQP) to send and receive messages from RabbitMQ of the other zones through Air Gap Bridge. However, it is noted that computer system 200 is not limited to using RabbitMQ or MongoDB for messaging handling. In some examples, the first and second bi-directional message queue server may be another service that uses another messaging protocol, such as Messaging Queue Telemetry Transport (MQTT) protocol, Constrained Application Protocol (CoAP) or Data Distribution Service (DDS).

In some examples, the first part 214 comprises a first writer module 217 configured to send messages to the second zone 220 and a first reader module 218 configured to receive messages from the second zone 220. In some examples, the first writer module 217 is one-directional to only send messages to the second zone 220 and the first reader module 218 is one-directional to only receive messages from the second zone 220. In some examples, the second part 225 comprises second bi-directional message queue server 226, a second writer module 227 and a second reader module 228. It is noted that the reader module 218 can examine the content of any message before passing the message on. This means the reader module 218 can intercept and block malicious messages.

In some examples, the first writer module 217 and the first reader module 218 are implemented as a different threads of a single process. In some examples, each thread may have its own set of information that lets the process know where it came from and what it should be doing. In other words, this lets it do its job and also to communicate with other processes. This may be known as the "context" of the thread or process.

In some examples, the first writer module 217 is coupled to the first bi-directional message queue server 216 via a first messaging connection to accept messages from the bi-directional message queue server and the second writer module is coupled to the first bi-directional message queue server via a second messaging connection, separate from the first messaging connection, to provide messages to the messaging server.

Air Gap Bridge (AGB) may be a micro-service and may be written in the Go programming language (https://go dev/), for example. The AGB may have a few dependencies, which enables AMQP messages to be passed over a one-way connection using an Air Gap Bridge Protocol (AGBP). In some examples, the AGBP may be a modification of any established MQ protocol that is better suited for messaging across an air gap.

In some examples, the first writer module 217 and the first reader module 218 may be implemented as a micro-service. Micro-services are an architectural and organisational approach to software development where software is composed of small independent services that communicate over well-defined application programming interfaces (APIs). In other words, first writer module 217 and first reader module 218 may be written in two different software languages and made compatible within the first messaging queue 213 through the use of APIs.

In some examples, the first writer module 217 and the first reader module 218 are configured to convert messages between a first protocol used to communicate with the messaging server and a second protocol used to communicate with the second zone 220. For example, first writer module 217 may receive a message from first bi-direction messaging queue server 216 through AMQP. First writer module 217 may then convert the AMQP message to another protocol, such as AGBP described above. Second reader module 228 may then receive the message sent from first writer module 217 and may convert the AGBP message to another protocol, such as AMQP, to pass the message to the second bi-directional message queue server 226.

In another example, where the writer and reader modules are implemented as threads in the same AGB process, each module may have separate AMQP connections to the same RabbitMQ server. As such, each writer module may wait for an event on either the AMQP channel (i.e., new message) or the heartbeat ticker (i.e., time to send a new heartbeat to the reader module). When a new message is received, the writer module reframes it as an AGBP message and sends it over the air gap. The reader waits for an event on the AGBP channel (i.e., new message) or the heartbeat deadline (i.e., time to close the connection). When a new message is received, the reader module reframes it as an AMQP message and sends it to RabbitMQ.

In some examples, second messaging queue 223 comprises a first part 224 in the second zone 220 and a second part 235 in the third zone 230. Second messaging queue 223 may operate similar to first messaging queue 213, but instead, receives and sends messages from second zone 220 and third zone 230. First part 224 and second part 235 may also each comprise a writer module, reader module and a bi-directional message queue server, similar to first part 214 and second part 225 of first messaging queue 213.

Vaults

In the sensitive zone, there may be two vaults implemented as a native application running on the base operating system. For example, one vault may be a storage server for permanently storing the dataset and another server, such as a GPU (DGX) server, may temporarily store the models queued for execution. The storage server may use Linux Unified Key Setup (LUKS) as the block device encryption. LUKS encrypts/decrypts the data transparently as it is written/read from the block device, not at the file level. Computer system 200 may use a software package called SAMBA (https://www.samba.org/) to make datasets in data vaults available to airlock containers on the one or more third computing components 231. SAMBA is a Windows interoperability suite of programs for Linux and Unix, and easily manages user credentials when a new share is created and removed. The data connection between one or more third computing components, such as the GPU (DGX) server and the data vault as previously described, may be established every time a new execution starts in an airlock and terminates when the execution completes.

Airlocks

Multiple independent operating system containers 233 may also be referred to as "airlocks", which are user-free zones (i.e., no access to the system user such as an IM&T staff). In some examples, airlocks may run on FedLearn App Server 236 in third zone 230. Computer system 200 may provide an airlock master, such as execution manager application 232, to orchestrate the creation of airlocks for execution, monitoring, and management of executions and transferring of outputs to secure zones. In some examples, the airlock master may be FedLearn App Server 236. The airlocks may be Docker container image instances with the machine learning model(s) or portion of the machine learning model(s) to be trained and all required libraries/dependencies required to execute within a Docker container. In addition, the airlock may use secure enclave technologies, such as Intel Software Guard Extensions (IntelSGX), which enables hardware-based memory encryption that isolates specific application code and data in memory.

Multiple independent operating system containers may be further configured to: terminate the training of the machine learning model after a predetermined time; provide the results of the training to the third computing components in response to terminating the training; and terminate the respective operating system container in response to terminating the training, thereby removing the sensitive data from the respective operating system container.

More specifically, each airlock instance is a user-free zone and may terminate by removing all data within an expected time frame. Once the execution is terminated, the airlock instance ensures the removal of data. It then sends the outputs/results to the airlock master (the executor manager), and the airlock instance is removed. An airlock instance may communicate only with the airlock master. Airlock instances may run using a secure enclave for the computations. Running the airlock instance as a secure enclave enables the airlock instances to be more secure, for which, even powerful system admins cannot see what is running in the system. The secure enclave may be a hardware module that is designed to perform operations while protecting the data via hardware means, such as hardware encryption, such that the plain text data does not leave the secure enclave hardware module and an admin cannot get access through software means.

The multiple independent operating system containers (i.e., airlocks) and data vaults prevent honest-but-curious IM&T staff of the host from using privileges granted at the hardware (e.g., physical access to computer and network racks) or operating system layers (e.g., memory and disk dump, and network trace) to have illegal access to datasets, models or data analysis outputs.

In some examples, each of the multiple independent operating system containers may be are configured to mount a data storage device storing the sensitive data from one of the multiple client devices. Mounting a data storage device in a container refers to making the data storage device, and hence the sensitive data on the data storage device, accessible to the container. As such, the container can access the sensitive data to train the machine learning model, as it contains all the required components, such as the machine learning model, libraries and training data.

Multiple Data Custodians

In some examples, the third computing components 231 may use automated deployment service to control execution of multiple independent operating system containers 233 on respective multiple client devices 234 and to operationalize distributed machine learning on multiple client devices 234. The automated deployment service may be a combination of automated deployment services. For example, the third computing components 231 may use Kubernetes (https://kubernetes.io/) and Argo Workflows (https://argoproj.github.io/workflows/) to enable execution manager application 232 to control the execution of multiple independent operating system containers 233 on respective multiple client devices 234.

Kubernetes is an open-source container orchestration system for automating software deployment, scaling, and management. Kubernetes enables self-healing (e.g., if a containerised app or an application component goes down, Kubernetes will instantly redeploy it, matching the so-called desired state) and high scalability. Argo Workflows is a Kubernetes Custom Resource Definition implementation for continuous integration/continuous deployment pipelines. In third zone 230, the execution manager submits and monitors the vetted machine learning models/queries to the Kubernetes, where the execution happens as Argo Workflows. Moreover, Argo is responsible for scheduling pods running machine learning applications and other resources in a workflow. Pods are the smallest deployable units of computing that you can create and manage in Kubernetes. A Pod is a group of one or more containers, with shared storage and network resources, and a specification for how to run the containers.

As an example, in federated learning, multiple client device 234 may be referred to as FedLearn App Clients, which each perform the full machine learning model training on local data, and these local models are aggregated in the execution manager, which may be referred to as FedLearn App Server 236. Whereas in split and splitfed learning, the FedLearn App Client carries training of a portion of the full model, and the remaining portion of the model is trained on FedLearn App Server 236.

In some examples, third computing components 231 are configured to return results of the training via the second messaging queue 223 to the second computing components 221, which are configured to provide the results of the training via the first messaging queue 213 to the first computing components 211. The first user may then access the results of the training, such as the trained machine learning model using the consumer web application 212.

In some examples, second computing components 221 are further configured to: provide the vetter web application 222 for the second user to inspect and approve the results of training in response to returning the results of the training to the second computing components 221; and send the results of the training via the first messaging queue 213 to the first computing components 211 in response to the second user approving the results via the vetter web application 222. As such, the second user may inspect the result of training the machine learning model before sending the results to the first user. Once the second user performs the vetting process on training results and approved the results, the second user may send the training results to the first user via first messaging queue 213. Similarly, the second user may perform a vetting process on the performance results of the trained machine learning model.

Figure 4:
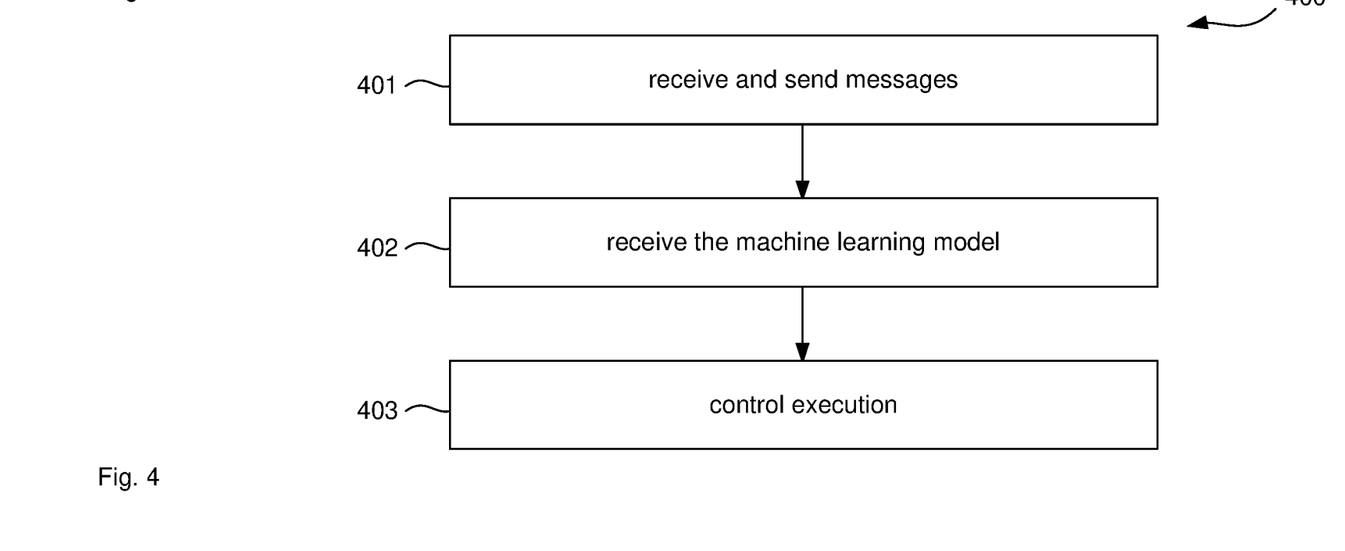
FIG. 4 illustrates a method for training a machine learning model on a sensitive data set in a first zone.

FIG. 4 illustrates a method 400 for training a machine learning model on a sensitive data set in a first zone. In some examples, one or more third components may perform method 400. One or more third components may firstly receive and send 401 messages from a second zone via a messaging queue. In method 400, first zone may be third zone 230 and the second zone in method 400 may be second zone 220 with reference to FIG. 2. Further, in method 400, the messaging queue may be second messaging queue 235 with reference to FIG. 2.

One or more third components may then receive 402 the machine learning model from the second zone via the messaging queue. Finally, one or more third components may control 403 execution of multiple independent operating system containers on respective multiple client devices to train the machine learning model on sensitive data hosted by the multiple client devices.

FIG. 4 is to be understood as a blueprint for the software program and may be implemented step-by-step, such that each step in FIG. 4 is represented by a function in a programming language, such as Python, C++ or Java. The resulting source code is then compiled and stored as computer-executable instructions on one or more third computing components 231.

It is noted that for most humans performing the method 400 manually, that is, without the help of a computer, would be practically impossible. Therefore, the use of the computer is part of the substance of the invention and allows performing the necessary calculations that would otherwise not be possible due to a large amount of data and the large number of calculations that are involved.

In some examples, method 400 may further comprise isolating the first zone from the second zone by establishing an air gap between the two zones as described in the above examples. As such, the first zone may be isolated form the second zone, which ensures the sensitive data that is used to train the machine learning model does not leave the first zone and is not accessible by anyone else besides a data custodian, such as a data consumer or an IM&T staff member.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer system comprising:
a first zone comprising one or more first processors that are accessible from other computers external to the computer system and configured to:
provide a consumer web application for a first user to define a machine learning model to be trained on a sensitive data set, and
send the machine learning model via a first messaging queue;
a second zone comprising one or more second processors that are isolated from the other computers and from the first zone, and configured to;
receive and send messages from the first processors via the first messaging queue,
receive the machine learning model from the first processors via the first messaging queue,
provide a vetter web application for a second user to inspect and approve the machine learning model, and
send the machine learning model via a second messaging queue in response to the second user approving the machine learning model; and
a third zone comprising one or more third processors isolated from the other computers, from the first zone and from the second zone, and configured to:
receive and send messages from the second zone via the second messaging queue,
receive the machine learning model from the second zone via the second messaging queue,
provide an execution manager application, the execution manager application being configured to control execution of multiple independent operating system containers on respective multiple client devices to train the machine learning model on sensitive data hosted by the multiple client devices, the multiple client devices being isolated from the other computers, from the first processors and from the second processors.

2. The computer system of claim 1, wherein the first messaging queue comprises a first part in the first zone and a second part in the second zone.

3. The computer system of claim 2, wherein the first part is implemented in a first container image and the second part is implemented in a second container image different from the first container image.

4. The computer system of claim 3, wherein the first part is executed by a first virtual machine in the first container image and the second part is executed by a second virtual machine in the second container image.

5. The computer system of claim 2, wherein the first part comprises a first bi-directional message queue server configured to process messages in the first zone and the second part comprises a second bi-directional message queue server configured to process messages in the second zone.

6. The computer system of claim 5, wherein the first part comprises a first writer module configured to send messages to the second zone and a first reader module configured to receive messages from the second zone.

7. The computer system of claim 6, wherein the first writer module is coupled to the first bi-directional message queue server via a first messaging connection to accept messages from the bi-directional message queue server and a second writer module is coupled to the first bi-directional message queue server via a second messaging connection, separate from the first messaging connection, to provide messages to the messaging server.

8. The computer system of claim 6, wherein the first writer module is one-directional to only send messages to the second zone and the first reader module is one-directional to only receive messages from the second zone.

9. The computer system of claim 6, wherein the first writer module and the first reader module are implemented as a micro-service.

10. The computer system of claim 6, wherein the first writer module and the first reader module are implemented as a different threads of a single process.

11. The computer system of claim 6, wherein the first writer module and the first reader module are configured to convert messages between a first protocol used to communicate with the messaging server and a second protocol used to communicate with the second zone.

12. The computer system of claim 6, wherein the first writer module in the first zone is configured to send messages to a corresponding second reader module in the second zone, and the first reader module in the first zone is configured to receive messages from a corresponding second writer module in the second zone.

13. The computer system of claim 2, wherein the second part comprises a second bi-directional message queue server, a second reader module and a second write module.

14. The computer system of claim 1, wherein the second messaging queue comprises a first part in the second zone and a second part in the third zone.

15. The computer system of claim 1, wherein the third processors are configured to return results of the training via the second messaging queue to the second processors, which are configured to provide the results of the training via the first messaging queue to the first processors.

16. The computer system of claim 15, wherein the second processors are further configured to:
provide the vetter web application for the second user to inspect and approve the results of training in response to returning the results of the training to the second processors; and
send the results of the training via the first messaging queue to the first processors in response to the second user approving the results via the vetter web application.

17. The computer system of claim 15, wherein each of the multiple independent operating system containers are further configured to:
terminate the training of the machine learning model after a predetermined time;
provide the results of the training to the third processors in response to terminating the training; and
terminate the respective operating system container in response to terminating the training, thereby removing the sensitive data from the respective operating system container.

18. The computer system of claim 1, wherein each of the multiple independent operating system containers are configured to mount a data storage device storing the sensitive data from one of the multiple client devices.

* * * * *